(12) United States Patent
Xu et al.

(10) Patent No.: US 11,926,793 B2
(45) Date of Patent: Mar. 12, 2024

(54) FCC CO-PROCESSING OF BIOMASS OIL

(71) Applicant: ExxonMobil Technology and Engineering Company, Annandale, NJ (US)

(72) Inventors: Xiaochun Xu, Basking Ridge, NJ (US); Hyung Rae Kim, Basking Ridge, NJ (US); Chengrong Wang, Easton, PA (US); Colin L. Beswick, Lebanon, NJ (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 17/931,560

(22) Filed: Sep. 13, 2022

(65) Prior Publication Data
US 2023/0131866 A1 Apr. 27, 2023

Related U.S. Application Data

(60) Provisional application No. 63/263,101, filed on Oct. 27, 2021.

(51) Int. Cl.
| | |
|---|---|
| *C10G 1/06* | (2006.01) |
| *C10G 11/18* | (2006.01) |
| *C10L 1/10* | (2006.01) |
| *C10L 1/14* | (2006.01) |
| *C10L 1/16* | (2006.01) |

(52) U.S. Cl.
CPC ............. *C10G 1/06* (2013.01); *C10G 11/18* (2013.01); *C10L 1/10* (2013.01); *C10G 2300/1011* (2013.01); *C10G 2300/4075* (2013.01); *C10G 2300/80* (2013.01); *C10L 1/106* (2013.01); *C10L 1/14* (2013.01); *C10L 1/143* (2013.01); *C10L 1/146* (2013.01); *C10L 1/1625* (2013.01)

(58) Field of Classification Search
CPC ...................... C10G 1/06; C10G 11/18; C10G 2300/1011; C10G 2300/4075; C10G 2300/80; C10L 1/10; C10L 1/106; C10L 1/14; C10L 1/143; C10L 1/1625
See application file for complete search history.

(56) References Cited

U.S. PATENT DOCUMENTS

| | | |
|---|---|---|
| 3,702,886 A | 11/1972 | Argauer et al. |
| 3,709,979 A | 1/1973 | Chu |

(Continued)

OTHER PUBLICATIONS

Pinho et al., "Co-processing raw bio-oil and gasoil in an FCC Unit", Fuel Processing Technology, Elsevier, vol. 131, pp. 159-166 (2015).

*Primary Examiner* — Ali Z Fadhel
(74) *Attorney, Agent, or Firm* — Shook, Hardy & Bacon L.L.P.

(57) ABSTRACT

Systems and methods are provided for improving product yields and/or product quality during co-processing of fast pyrolysis oil in a fluid catalytic cracking (FCC) reaction environment. The systems and methods can allow for co-processing of an increased amount of fast pyrolysis oil while reducing or minimizing coke production for a feedstock including fast pyrolysis oil and a conventional FCC feed. The reducing or minimizing of coke production can be achieved in part by adding a low molecular weight, non-ionic surfactant to the mixture of fast pyrolysis oil and conventional FCC feed.

19 Claims, 3 Drawing Sheets

(56) References Cited

U.S. PATENT DOCUMENTS

| | | |
|---|---|---|
| 3,770,614 A | 7/1973 | Graven |
| 3,832,449 A | 8/1974 | Rosinski et al. |
| 3,948,758 A | 4/1976 | Bonacci et al. |
| 4,016,245 A | 4/1977 | Plank et al. |
| 4,076,842 A | 2/1978 | Plank et al. |
| 4,229,424 A | 10/1980 | Kokotailo |
| 4,254,297 A | 3/1981 | Frenken et al. |
| 4,310,440 A | 1/1982 | Wilson et al. |
| 4,440,871 A | 4/1984 | Lok et al. |
| 4,500,651 A | 2/1985 | Lok et al. |
| 4,804,647 A | 2/1989 | Pellet et al. |
| 8,007,662 B2 | 8/2011 | Lomas et al. |
| 8,691,076 B2 | 4/2014 | Kim et al. |
| 9,102,888 B2 | 9/2015 | Freel et al. |
| 9,944,859 B2 | 4/2018 | Fjare et al. |
| 2016/0168481 A1* | 6/2016 | Ray .................. C10G 33/04 585/350 |
| 2021/0348065 A1* | 11/2021 | Freel .................. C10G 11/18 |

* cited by examiner

FCC CO-PROCESSING OF BIOMASS OIL

CROSS-REFERENCE TO RELATED APPLICATIONS

This application claims the benefit of U.S. Provisional Application No. 63/263,101, filed on Oct. 27, 2021, the entire contents of which are incorporated herein by reference.

FIELD

Systems and methods are provided for co-processing of pyrolysis oil in a fluid catalytic cracking reaction environment.

BACKGROUND

Fluid catalytic cracking (FCC) processes are commonly used in refineries as a method for converting feedstocks, without requiring additional hydrogen, to produce lower boiling fractions suitable for use as fuels. Typical feedstocks can correspond to vacuum gas oil fractions, since lower boiling fractions are already within the fuels boiling range, while vacuum resid fractions are typically not as suitable for processing under FCC conditions.

Although conventional vacuum gas oil fractions are derived from mineral crude oils, oils derived from biomass can also be formed with boiling ranges similar to the vacuum gas oil boiling range. Biomass can be converted to bio-oil through thermochemical conversion processes. Examples of such conversion processes include fast pyrolysis, catalytic pyrolysis, hydropyrolysis, and hydrothermal liquefaction.

Some recent work has shown that co-processing of biomass oil with conventional feed can be performed in FCC units. However, it is conventionally believed that pyrolysis oils derived from fast pyrolysis are not well-suited for co-processing. This is due in part to increased coke yield when co-processing fast pyrolysis oils with conventional mineral feeds. As a result, it is conventionally understood that fast pyrolysis oil should be limited to less than 10% of the feedstock when performing co-processing under FCC conditions.

It would be desirable to have systems and methods to facilitate co-processing of fast pyrolysis oils under fluid catalytic cracking conditions while reducing or minimizing coke production. Preferably, the systems and methods can allow for co-processing of higher percentages of fast pyrolysis oils while maintaining such reduced or minimized coke production.

U.S. Pat. No. 9,944,859 describes methods for co-processing of mineral feedstocks with fast pyrolysis oils in the presence of high molecular weight polymers that are used as emulsifiers. The emulsifier described in the examples has a molecular weight of roughly 5000 g/mol. The amount of emulsifier used in the examples corresponds to 1.0 wt %. Increased coke production was observed when processing mixtures of 10 wt % fast pyrolysis oil with conventional FCC feed, relative to processing the conventional FCC feed alone under similar conditions.

U.S. Pat. No. 9,102,888 describes methods for co-processing of mineral feedstocks with renewable fuel oils. The renewable fuel oil appears to correspond to a pyrolysis oil. For blends of 2.0 wt % or 5.0 wt % of renewable fuel oil in conventional FCC feed, coke production was reported to be similar to processing of the conventional FCC feed alone. For blends with 10 wt % of renewable fuel oil in conventional FCC feed, an increase in coke production was reported relative to FCC feed alone.

A journal article by Pinho et. al. (Fuel Processing Technology, Vol. 131, pages 159-166 (2015)) describes co-processing of a fast pyrolysis oil with a vacuum gas oil feed. The fast pyrolysis oil was introduced into the FCC reactor separately from the vacuum gas oil, so that the vacuum gas oil could be pre-heated prior to entering the reactor.

SUMMARY

In an aspect, a method for co-processing pyrolysis oil is provided. The method includes exposing a feedstock comprising a) 5.0 wt % to 35 wt % of a pyrolysis oil, the pyrolysis oil comprising an oxygen content, excluding water, of 20 wt % or more, b) 0.01 wt % to 1.0 wt % of a non-ionic surfactant having a molecular weight of 300 g/mol to 2000 g/mol, and c) 65 wt % or more of a feed comprising 10 wt % or more of hydrogen and a T10 distillation point of 300° C. or higher, to a catalyst in a reactor under fluid catalytic cracking conditions to form one or more liquid product fractions. Optionally, the pyrolysis oil, non-ionic surfactant, and feed comprising 10 wt % or more of hydrogen can be mixed prior to entering the reactor.

DETAILED DESCRIPTION

Figure 1:
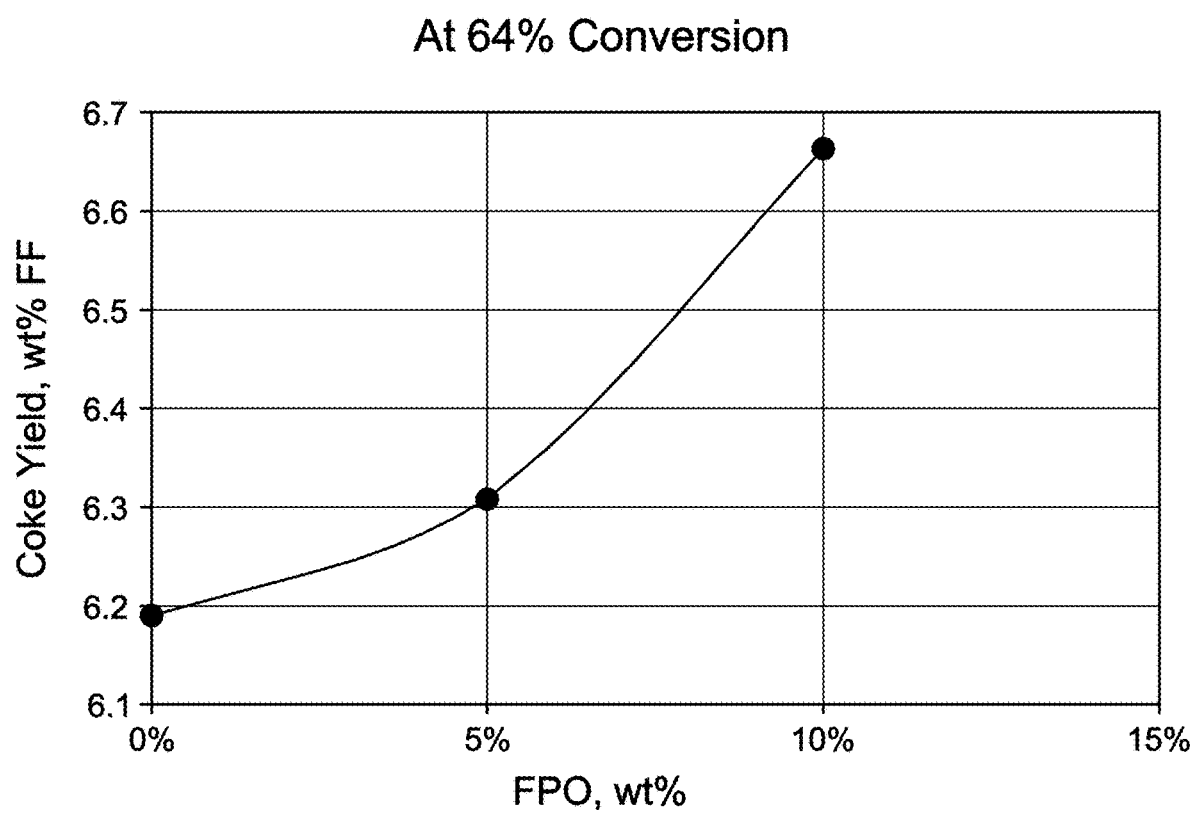
FIG. 1 coke production during co-processing of various amounts of fast pyrolysis oil with a vacuum gas oil feed.

All numerical values within the detailed description and the claims herein are modified by "about" or "approximately" the indicated value, and take into account experimental error and variations that would be expected by a person having ordinary skill in the art.

Overview

In various aspects, systems and methods are provided for improving product yields and/or product quality during co-processing of fast pyrolysis oil in a fluid catalytic cracking (FCC) reaction environment. The systems and methods can allow for co-processing of an increased amount of fast pyrolysis oil while reducing or minimizing coke production for a feedstock including fast pyrolysis oil and a conventional FCC feed. The reducing or minimizing of coke production can be achieved in part by adding a low molecular weight, non-ionic surfactant to the mixture of fast pyrolysis oil and conventional FCC feed, and then mixing the resulting mixture prior to FCC processing.

Fast pyrolysis is one of several types of thermal conversion processes for conversion of biomass to bio-oil. Fast pyrolysis, however, results in a qualitatively different type of bio-oil relative to other types of bio-oil formed from thermal conversion. One characteristic of pyrolysis oil produced by fast pyrolysis (also referred to as "fast pyrolysis oil) is that a fast pyrolysis oil typically has a higher water content than other types of pyrolysis oils. Fast pyrolysis oil typically has a water content of 20 wt % or higher. This is in contrast to pyrolysis oils formed by other methods, where the water content is 15 wt % or less. Due in part to this additional water content, the oxygen content of a fast pyrolysis oil can be greater than 40 wt %, and possibly over 50 wt % (such as up to 55 wt % or possibly still higher). If water is excluded the oxygen content of fast pyrolysis oil can be between 20 wt % and 40 wt %. These elevated oxygen contents are believed to due in part to fast pyrolysis oil performing a less complete conversion of biomass.

Another difficulty with fast pyrolysis oil is that fast pyrolysis oil is more challenging to co-process under fluid catalytic cracking conditions. For example, under conventional conditions, co-processing of fast pyrolysis oil with a typical FCC feedstock results in increased coke production. Due in part to this increased coke production, co-processing of fast pyrolysis oil under FCC conditions is typically limited to co-processing where the fast pyrolysis oil corresponds to 10 wt % or less of the total feed.

It has been discovered that part of the difficulty with co-processing of fast pyrolysis oils is due to the pyrolysis oil forming a phase of large droplets suspended in the remaining mineral portion of the feedstock. Without being bound by any particular theory, it is believed that these larger droplets make it more difficult for hydrogen to transfer from the mineral portion of the feedstock to the fast pyrolysis oil portion. It is noted that FCC feedstocks are typically heated prior to introduction of feedstock into a FCC reaction environment. It has further been discovered that heating of a feedstock can accelerate the process of forming larger droplets of fast pyrolysis oil.

It has further been discovered that the size of the droplets of fast pyrolysis oil can be reduced or minimized by adding a low molecular weight, non-ionic surfactant to the feedstock. After adding the surfactant, the feedstock can be mixed to allow for dispersion of the fast pyrolysis oil in the mineral portion of the feedstock. The resulting mixture can then be processed under fluid catalytic cracking conditions. It has been found that by reducing or minimizing the droplet size of the fast pyrolysis oil in the feedstock, larger amounts of fast pyrolysis oil can be co-processed while unexpectedly reducing coke production. This is in contrast to the conventional result, where co-processing of 10 wt % or more of pyrolysis oil with a mineral feed results in increased coke production.

Due to the high oxygen content of fast pyrolysis oils, fast pyrolysis oils typically behave like polar compositions. This is in contrast to typical mineral FCC feeds, which correspond to non-polar compositions. Addition of a low molecular weight, non-ionic surfactant to a mixture of fast pyrolysis oil and conventional FCC feed can result in a reduction in droplet size for the fast pyrolysis oil in the conventional feed at relatively low concentrations for the surfactant. By contrast, higher molecular weight surfactants do not provide this reduction in droplet size under similar conditions. Without being bound by any particular theory, it is believed that this reduction in droplet size for fast pyrolysis oil mixed with a conventional FCC feed allows for improved hydrogen transfer between the conventional FCC feed and droplets of the fast pyrolysis oil. This allows for a reduction in coke production during fluid catalytic cracking, as the improved hydrogen transfer from the conventional FCC feed can offset the low hydrogen content of the fast pyrolysis oil. In some aspects, the reduced droplet size of the fast pyrolysis oil in the mixture with the conventional feedstock can also provide improved flow characteristics for the mixture prior to entering the fluid catalytic cracking reaction zone.

It is noted that the addition of a low molecular weight, non-ionic surfactant can provide two separate benefits. One benefit of a low molecular weight, non-ionic surfactant is that the coke production from co-processing of fast pyrolysis oil and conventional FCC feed can be reduced or minimized. A second benefit is that the yield of liquid products (naphtha, cycle oil, bottoms) derived from the fast pyrolysis oil portion of a feedstock can be increased by using a non-ionic surfactant. Such a yield improvement for the fast pyrolysis oil portion can be determined, for example, by comparing the yield for the conventional feed alone with the yield for a feedstock including fast pyrolysis oil, the conventional feed, and the surfactant. It is further noted that the yield benefit for liquid products can be achieved by using a non-ionic surfactant of any convenient molecular weight. For example, non-ionic surfactants with molecular weights of 5000 g/mol or possibly still higher may also provide improvement in yield of liquid products. However, such higher molecular weight non-ionic surfactants cannot realize the additional benefit of reducing or minimizing coke production when co-processing fast pyrolysis oil with conventional FCC feed under the conditions described herein.

Reducing or minimizing coke production during FCC co-processing of fast pyrolysis oil can be beneficial, for example, for providing an expanded operating window for a fluid catalytic cracking system. During FCC processing of a feedstock, coke accumulated on the FCC catalyst is consumed by combusting the coke in an associated regenerator. The heat generated in the regenerator is used to maintain the temperature of the FCC reaction environment. Thus, during steady-state operation, the operating conditions in the FCC reactor are in heat balance with the heat generated in the regenerator. When a feedstock results in an increase in coke production, the operating conditions either need to be changed to accommodate the additional heat generated by combustion of the additional coke, or the operating conditions need to be changed to reduce the coke production. By contrast, when coke production is reduced in an FCC reaction environment, an operator can choose to offset the loss in heat from coke combustion by adding supplemental fuel to the regenerator. This can allow a desirable or target set of operating conditions to be maintained when changing from a conventional FCC feed to a feedstock that also includes fast pyrolysis oil.

Definitions

In this discussion, for the products from an FCC process, the light cycle oil (LCO) boiling range is defined as 430° F. to 650° F., or 221° C. to 343° C. Thus, the LCO yield from an FCC process corresponds to the portion of the effluent in the boiling range of 221° C. to 343° C. In this discussion, the bottoms from an FCC process are defined as the 650° F.+ or 343° C.+ yield. Thus, the Bottoms yield from an FCC process corresponds to the portion of the effluent that boils above 343° C.

In this discussion, conversion of a feed within an FCC reactor is defined as (100−LCO yield−Bottoms yield). This definition results in a conversion expressed in weight percent. This definition effectively corresponds to measuring conversion relative to 221° C. However, this definition also accounts for the fact that an FCC process also produces coke. By defining conversion as (100−LCO yield−Bottoms yield), any coke that is formed is also counted as a conversion product, even though coke actually has a much higher boiling point than 221° C. It is also noted that fast pyrolysis oil typically includes a substantial amount of water. The composition of such a pyrolysis oil can either be described by including water as a component, or the composition can be described on a "dry" basis, where water is excluded from the weight ratio of components in the pyrolysis oil. The above definition for conversion can be used when describing a pyrolysis oil feed and/or FCC input feed on a dry basis. When the description of a FCC feed composition includes water as part of the composition, the presence of water in the feed (Feed Water) can be accounted for when calculating conversion by using the following formula: Conversion=(100−LCO yield−Bottom yield−Feed Water)/(100−Feed water).

In various aspects, reference may be made to one or more types of fractions generated during distillation of a petroleum feedstock. Such fractions may include naphtha fractions, kerosene fractions, diesel fractions, and vacuum gas oil fractions. Each of these types of fractions can be defined based on a boiling range, such as a boiling range that includes at least ~90 wt % of the fraction, or at least ~95 wt % of the fraction. For example, for naphtha fractions, at least ~90 wt % of the fraction, or at least ~95 wt %, can have a boiling point in the range of ~85° F. (~29° C.) to ~430° F. (~221° C.). For some heavier naphtha fractions, at least ~90 wt % of the fraction, or at least ~95 wt %, can have a boiling point in the range of ~85° F. (~29° C.) to ~400° F. (~204° C.). For a light cycle oil (LCO) fraction, at least 90 wt %, or at least 95 wt %, of the fraction can have a boiling point in the range of ~430° F. (~221° C.) to ~650° F. (~343° C.). For a (vacuum) gas oil fraction, at least ~90 wt % of the fraction, and preferably at least ~95 wt %, can have a boiling point in the range of ~650° F. (~343° C.) to ~1100° F. (~593° C.). It is noted that 343° C.+ fractions used as feeds may be referred to as vacuum gas oil boiling range fractions, while an FCC product fraction of 343° C.+ compounds can be referred to as bottoms fraction.

In this discussion, a liquid fuel product yield can be referred to. The liquid fuel product yield is defined herein as the combined amount of naphtha (29° C.-221° C.) and light cycle oil (221° C. to 343° C.) yield generated in the FCC reactor, relative to the weight of the fresh input feed (either conventional or biomass oil). In this discussion, yields of other products, such as CO, are also specified relative to the weight of fresh input feed to the FCC reactor, unless stated otherwise. In this discussion, the total liquid product yield is defined herein as the combined amount of naphtha, light cycle oil, and bottoms generated in the FCC reactor. In this discussion, fractions generated by an FCC process that contain naphtha, light cycle oil, and/or bottoms can be referred to as liquid product fractions.

In this discussion, references to boiling ranges/distillation ranges for fractions can be determined according to ASTM D2887. If ASTM D2887 is not suitable for some reason, ASTM D7169 may be used instead.

Feedstock Components

In various aspects, an unexpected reduction in coke production can be achieved when processing a feedstock that includes a combination of fast pyrolysis oil, a conventional feed for fluid catalytic cracking (such as a mineral feed), and a low molecular weight, non-ionic surfactant. In some aspects, the feedstock can include 12 wt % or more of fast pyrolysis oil, or 15 wt % or more, or 18 wt % or more. For example, a feedstock can include 12 wt % to 35 wt % fast pyrolysis oil, or 15 to 35 wt %, or 18 wt % 35 wt %, or 12 wt % to 30 wt %, or 15 wt % to 30 wt %, or 18 wt % to 30 wt %, or 12 wt % to 25 wt %, or 15 wt % to 25 wt %, or 18 wt % to 25 wt %. In other aspects, lower amounts of the fast pyrolysis oil can be included, so that the fast pyrolysis oil corresponds to 4.0 wt % to 35 wt % of the feedstock, or 4.0 wt % to 12 wt %, or 4.0 wt % to 10 wt %. Additionally or alternately, the feedstock can include 0.01 wt % to 1.0 wt % of a low molecular weight, non-ionic surfactant, or 0.01 wt % to 0.5 wt %, or 0.01 wt % to 0.2 wt %, or 0.05 wt % to 1.0 wt %, or 0.05 wt % to 0.5 wt %. Further additionally or alternately, the feedstock can include 60 wt % or more of conventional feed for FCC processing, or 65 wt % or more, or 70 wt % or more, or 75 wt % or more, such as up to 87.99 wt % of the feedstock. In some aspects, this can correspond to the balance of the feedstock. In aspects where a lower amount of fast pyrolysis oil is included in the feedstock, the feedstock can include up to 96 wt % of conventional feed.

In some aspects, the fast pyrolysis oil, low molecular weight non-ionic surfactant, and conventional feed can be mixed prior to introducing the feedstock into the FCC reaction environment. In such aspects, after forming a mixture of fast pyrolysis oil, conventional FCC feed, and surfactant, the mixture can optionally be mixed to allow for good dispersion of the fast pyrolysis oil in the conventional FCC feed. The mixing can also facilitate forming smaller droplets of the fast pyrolysis oil. In other alternative aspects, it may be possible to introduce one or more portions of the feedstock as separate flows from at least one remaining portion of the feedstock. For example, if suitable mixing can be performed internally in the FCC reaction environment, it may be possible to introduce at least a portion of the fast pyrolysis oil separately from at least a portion of the conventional feedstock, so long as the net feedstock delivered to the FCC reaction environment has a composition as defined herein.

In some aspects, the weight ratio of non-ionic surfactant to fast pyrolysis oil can be relatively low. Conventionally, it would be expected that a feedstock including 10 wt % or more of fast pyrolysis oil would benefit from including 1.0 wt % or more of surfactant. For a hypothetical feedstock including 1.0 wt % of surfactant and 10 wt % of fast pyrolysis oil, the weight ratio of surfactant to fast pyrolysis oil would be 0.1. In some aspects, it has been discovered that substantially lower concentrations of surfactant can be beneficial for reducing coke production for a feedstock including both fast pyrolysis oil and conventional feed. In such aspects, the weight ratio of surfactant to fast pyrolysis oil can be 0.01 or less, or 0.005 or less, or 0.002 or less, such as down to 0.0005 or possibly still lower.

The low molecular weight, non-ionic surfactant can correspond to a non-ionic surfactant that has a molecular weight of 2000 g/mol or less, or 1500 g/mol or less, or 1000 g/mol or less, or 750 g/mol or less, such as down to 500 g/mol or less, or 300 g/mol or possibly still lower. The non-ionic surfactant can include a hydrophilic functional group and a hydrophobic functional group within the surfactant molecule. This can allow the non-ionic surfactant to reduce or minimize surface tension within a feedstock while also reducing droplet size with the feedstock. Examples of non-ionic surfactants include, but are not limited to, ethoxylates, alkoxylates, and cocamides. An example of a low molecular weight, non-ionic surfactant is Triton™ X-100. Triton™ X-100 corresponds to polyethylene oxide with an aromatic tail on one end. This results in a compound that has a hydrophobic end and a hydrophilic end. Triton™ X-100 has a molecular weight of roughly 650 g/mol. Another example is Tween® 80, which is a polysorbate-type nonionic surfactant derived from the ethoxylation of sorbitan linked with hydrophobic oleic acid group. Tween® 80 has a molecular weight of roughly 1310 g/mol.

The conventional portion of the feedstock can correspond to any convenient feed that has a suitable boiling range for FCC processing and that has a sufficient hydrogen content. Conventional feeds for FCC processing can have a T5 distillation point and/or a T10 distillation point of 300° C. or higher, or 330° C. or higher, or 350° C. or higher, such as up to having a T10 distillation point of 500° C. or possibly still higher. Additionally or alternately, a conventional FCC feed can have a hydrogen content of 10 wt % or more, or 11 wt % or more, or 12 wt % or more, such as up to 15 wt % or possibly still higher. It is noted that biomass oils typically have a hydrogen content of 9.0 wt % or less. It is further noted that under this definition, FCC feeds including materials such as Fischer-Tropsch materials can correspond to "conventional" FCC feeds. Further additionally or alternately, a conventional FCC feed can have a final boiling point and/or a T95 boiling point and/or a T90 boiling point of 600° C. or less, or 570° C. or less, or 540° C. or less, such as down to 400° C. or possibly still lower.

A wide range of petroleum and chemical feedstocks can be hydroprocessed to form an FCC input feed suitable for low temperature/high conversion FCC processing. Suitable feedstocks include whole and reduced petroleum crudes, atmospheric, cycle oils, gas oils, including vacuum gas oils and coker gas oils, light to heavy distillates including raw virgin distillates, hydrocrackates, hydrotreated oils, extracts, slack waxes, Fischer-Tropsch waxes, raffinates, and mixtures of these materials.

In some aspects, a conventional FCC feed can have a sulfur content of ~500 wppm to ~50000 wppm, or ~500 wppm to ~20000 wppm, or ~500 wppm to ~10000 wppm. Additionally or alternately, the nitrogen content of such a feed can be ~20 wppm to ~8000 wppm, or ~50 wppm to ~4000 wppm. In some aspects, the feed can correspond to a "sweet" feed, so that the sulfur content of the feed can be ~10 wppm to ~500 wppm and/or the nitrogen content can be ~1 wppm to ~100 wppm.

Formation of Fast Pyrolysis Oil

The biomass used as feed for a fast pyrolysis process can be any convenient type of biomass. Examples of suitable biomass sources can include woody biomass and switchgrass. More generally, the biomass used as feed for a biomass conversion process can be any convenient type of biomass. Some forms of biomass can include direct forms of biomass, such as algae biomass and plant biomass. Other forms of biomass may correspond to waste products, such as food waste, animal waste, paper, and/or other waste products originally formed from biomass materials. In this discussion, municipal solid waste is included within the definition of biomass, even though a portion of the solids in municipal solid waste may not strictly correspond to solids derived from biomass.

In addition to carbon, oxygen, and hydrogen, depending on the form of the biomass, other heteroatoms may be present such as nitrogen, phosphorus, sulfur, and/or various metals. Biomass can generally have a molar ratio of hydrogen to carbon of 2:1 or less, but that is typically accompanied by a substantial amount of oxygen. Thus, conversion of biomass without using additional hydrogen typically results in production of liquid products (e.g., biomass oil) with hydrogen to carbon molar ratios substantially below 2:1. This is part of why co-processing in an FCC unit is desirable for biomass oil, as FCC processing provides a way to upgrade biomass oil to fuel products/fuel blending products without having to add substantial amounts of hydrogen to the reaction environment.

In aspects where the biomass is introduced into a reaction environment at least partially as solids, having a small particle size can facilitate transport of the solids into the reactor or other reaction environment. In some instances, smaller particle size can potentially also contribute to achieving a desired level of conversion of the biomass under the short residence time conditions. Thus, one or more optional physical processing steps can be used to prepare solid forms of biomass for conversion. In such optional aspects, the solids can be crushed, chopped, ground, or otherwise physically processed to reduce the median particle size to 3.0 cm or less, or 2.5 cm or less, or 2.0 cm or less, or 1.0 cm or less, such as down to 0.01 cm or possibly still smaller. For determining a median particle size, the particle size is defined as the diameter of the smallest bounding sphere that contains the particle.

During fast pyrolysis, the biomass is exposed to temperatures of 450° C. to 600° C. in a substantially $O_2$-free environment. The biomass oil can then be condensed from the resulting vapors formed by the pyrolysis process.

As noted above, fast pyrolysis oil typically has a water content of 20 wt % or higher. This is in contrast to pyrolysis oils formed by other methods, where the water content is 15 wt % or less. Due in part to this additional water content, the oxygen content of a fast pyrolysis oil can be greater than 40 wt %, and possibly over 50 wt % (such as up to 55 wt % or possibly still higher). If water is excluded the oxygen content of fast pyrolysis oil can be between 25 wt % and 40 wt %.

Fast pyrolysis oil can also have a relatively low hydrogen content. Excluding hydrogen present in a fast pyrolysis oil due to the presence of water, a fast pyrolysis oil can have a hydrogen content of 6.0 wt % or less, or 5.5 wt % or less, or 5.0 wt % or less, such as down to 3.5 wt % or possibly still lower.

FCC Processing Conditions

An example of a suitable reactor for performing an FCC process can be a riser reactor. Within the reactor riser, the feeds for co-processing can be contacted with a catalytic cracking catalyst under cracking conditions thereby resulting in spent catalyst particles containing carbon deposited thereon and a lower boiling product stream. The cracking conditions can include: temperatures from 900° F. to 1060° F. (~482° C. to ~571° C.), or 950° F. to 1040° F. (~510° C. to ~560° C.); hydrocarbon partial pressures from 10 to 50 psia (~70-350 kPa-a), or from 20 to 40 psia (~140-280 kPa-a); and a catalyst to feed (wt/wt) ratio from 3 to 8, or 5 to 6, where the catalyst weight can correspond to total weight of the catalyst composite. Steam may be concurrently introduced with the feed into the reaction zone. The steam may comprise up to 5 wt % of the feed. In some aspects, the FCC feed residence time in the reaction zone can be less than 5 seconds, or from 3 to 5 seconds, or from 2 to 3 seconds.

Catalysts suitable for use within the FCC reactor herein can be fluid cracking catalysts comprising either a large-pore molecular sieve or a mixture of at least one large-pore molecular sieve catalyst and at least one medium-pore molecular sieve catalyst. Large-pore molecular sieves suitable for use herein can be any molecular sieve catalyst having an average pore diameter greater than ~0.7 nm which are typically used to catalytically "crack" hydrocarbon feeds. In various aspects, both the large-pore molecular sieves and the medium-pore molecular sieves used herein be selected from those molecular sieves having a crystalline tetrahedral framework oxide component. For example, the crystalline tetrahedral framework oxide component can be selected from the group consisting of zeolites, tectosilicates, tetrahedral aluminophosphates (ALPOs) and tetrahedral silicoaluminophosphates (SAPOs). Preferably, the crystalline framework oxide component of both the large-pore and medium-pore catalyst can be a zeolite. More generally, a molecular sieve can correspond to a crystalline structure having a framework type recognized by the International Zeolite Association. It should be noted that when the cracking catalyst comprises a mixture of at least one large-pore molecular sieve catalyst and at least one medium-pore molecular sieve, the large-pore component can typically be used to catalyze the breakdown of primary products from the catalytic cracking reaction into clean products such as naphtha and distillates for fuels and olefins for chemical feedstocks.

Large pore molecular sieves that are typically used in commercial FCC process units can be suitable for use herein. FCC units used commercially generally employ conventional cracking catalysts which include large-pore zeolites such as USY or REY. Additional large pore molecular sieves that can be employed in accordance with the present invention include both natural and synthetic large pore zeolites. Non-limiting examples of natural large-pore zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, and ferrierite. Non-limiting examples of synthetic large pore zeolites are zeolites X, Y, A, L, ZK-4, ZK-5, B, E, F, H, J, M, Q, T, W, Z, alpha and beta, omega, REY and USY zeolites. In some aspects, the large pore molecular sieves used herein can be selected from large pore zeolites. In such aspects, suitable large-pore zeolites for use herein can be the faujasites, particularly zeolite Y, USY, and REY.

Medium-pore size molecular sieves that are suitable for use herein include both medium pore zeolites and silicoaluminophosphates (SAPOs). Medium pore zeolites suitable for use in the practice of the present invention are described in "Atlas of Zeolite Structure Types", eds. W. H. Meier and D. H. Olson, Butterworth-Heineman, Third Edition, 1992, hereby incorporated by reference. The medium-pore size zeolites generally have an average pore diameter less than about 0.7 nm, typically from about 0.5 to about 0.7 nm and includes for example, MFI, MFS, MEL, MTW, EUO, MTT, HEU, FER, and TON structure type zeolites (IUPAC Commission of Zeolite Nomenclature). Non-limiting examples of such medium-pore size zeolites, include ZSM-5, ZSM-12, ZSM-22, ZSM-23, ZSM-34, ZSM-35, ZSM-38, ZSM-48, ZSM-50, silicalite, and silicalite 2. An example of a suitable medium pore zeolite can be ZSM-5, described (for example) in U.S. Pat. Nos. 3,702,886 and 3,770,614. Other suitable zeolites can include ZSM-11, described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. As mentioned above SAPOs, such as SAPO-11, SAPO-34, SAPO-41, and SAPO-42, described (for example) in U.S. Pat. No. 4,440,871 can also be used herein. Non-limiting examples of other medium pore molecular sieves that can be used herein include chromosilicates; gallium silicates; iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651 and iron aluminosilicates. All of the above patents are incorporated herein by reference.

The medium-pore size zeolites (or other molecular sieves) used herein can include "crystalline admixtures" which are thought to be the result of faults occurring within the crystal or crystalline area during the synthesis of the zeolites. Examples of crystalline admixtures of ZSM-5 and ZSM-11 can be found in U.S. Pat. No. 4,229,424, incorporated herein by reference. The crystalline admixtures are themselves medium-pore size zeolites, in contrast to physical admixtures of zeolites in which distinct crystals of crystallites of different zeolites are physically present in the same catalyst composite or hydrothermal reaction mixtures.

In some aspects, the large-pore zeolite catalysts and/or the medium-pore zeolite catalysts can be present as "self-bound" catalysts, where the catalyst does not include a separate binder. In some aspects, the large-pore and medium-pore catalysts can be present in an inorganic oxide matrix component that binds the catalyst components together so that the catalyst product can be hard enough to survive inter-particle and reactor wall collisions. The inorganic oxide matrix can be made from an inorganic oxide sol or gel which can be dried to "glue" the catalyst components together. Preferably, the inorganic oxide matrix can be comprised of oxides of silicon and aluminum. It can be preferred that separate alumina phases be incorporated into the inorganic oxide matrix. Species of aluminum oxyhydroxides-$\gamma$-alumina, boehmite, diaspore, and transitional aluminas such as $\alpha$-alumina, $\beta$-alumina, $\gamma$-alumina, $\delta$-alumina, $\epsilon$-alumina, $\kappa$-alumina, and $\rho$-alumina can be employed. Preferably, the alumina species can be an aluminum trihydroxide such as gibbsite, bayerite, nordstrandite, or doyelite. Additionally or alternately, the matrix material may contain phosphorous or aluminum phosphate. Optionally, the large-pore catalysts and medium-pore catalysts be present in the same or different catalyst particles, in the aforesaid inorganic oxide matrix.

In the FCC reactor, the cracked FCC product can be removed from the fluidized catalyst particles. Preferably this can be done with mechanical separation devices, such as an FCC cyclone. The FCC product can be removed from the reactor via an overhead line, cooled and sent to a fractionator tower for separation into various cracked hydrocarbon product streams. These product streams may include, but are not limited to, a light gas stream (generally comprising $C_4$ and lighter hydrocarbon materials), a naphtha (gasoline) stream, a distillate (diesel and/or jet fuel) steam, and other various heavier gas oil product streams. The other heavier stream or streams can include a bottoms stream.

In the FCC reactor, after removing most of the cracked FCC product through mechanical means, the majority of, and preferably substantially all of, the spent catalyst particles can be conducted to a stripping zone within the FCC reactor. The stripping zone can typically contain a dense bed (or "dense phase") of catalyst particles where stripping of volatiles takes place by use of a stripping agent such as steam. There can also be space above the stripping zone with a substantially lower catalyst density which space can be referred to as a "dilute phase". This dilute phase can be thought of as either a dilute phase of the reactor or stripper in that it will typically be at the bottom of the reactor leading to the stripper.

In some aspects, the majority of, and preferably substantially all of, the stripped catalyst particles are subsequently conducted to a regeneration zone wherein the spent catalyst particles are regenerated by burning coke from the spent catalyst particles in the presence of an oxygen containing gas, preferably air thus producing regenerated catalyst particles. This regeneration step restores catalyst activity and simultaneously heats the catalyst to a temperature from 1200° F. to 1400° F. (~649 to 760° C.). The majority of, and preferably substantially all of the hot regenerated catalyst particles can then be recycled to the FCC reaction zone where they contact injected FCC feed.

Comparative Example 1—FCC Co-Processing of Fast Pyrolysis Oil and Vacuum Gas Oil FIG. 1 shows results from FCC processing of feedstocks including either 0%, 5.0 wt %, or 10 wt % of a fast pyrolysis oil with a vacuum gas oil co-feed in a pilot scale FCC reactor. The vacuum gas oil corresponded to a vacuum gas oil generated at a commercial scale refinery, and was representative of the type of vacuum gas oils used as a feed for an FCC process. The fast pyrolysis oil corresponded to a fast pyrolysis oil made by fast pyrolysis of woody biomass. Additional details regarding the fast pyrolysis oil and the vacuum gas oil are provided in Example 2 below.

The FCC processing conditions resulted in roughly 64% conversion of the feedstocks. FIG. 1 shows the amount of coke generated during the FCC processing relative to the amount of fast pyrolysis oil in the feedstock.

As shown in FIG. 1, at constant conversion, addition of fast pyrolysis oil to a conventional vacuum gas oil feedstock resulted in an increase in coke production. The increase was modest at 5.0 wt % of fast pyrolysis oil in the feedstock, but became more pronounced at 10 wt % of fast pyrolysis oil in the feedstock.

Example 2—Examples of Fast Pyrolysis Oil and Vacuum Gas Oil Properties

Table 1 shows the properties of a bio-oil formed by a fast pyrolysis process. Table 1 shows the oxygen, hydrogen, and carbon contents of the fast pyrolysis oil both with included water and excluding any water present in the fast pyrolysis oil. Table 1 also includes molar ratios of hydrogen to carbon (H/C), oxygen to carbon (O/C), effective hydrogen to carbon (H-2O/C), and hydrogen to oxygen (H/O). It is noted that when determining these ratios, water present in the fast pyrolysis oil was excluded from the calculations.

TABLE 1

Properties of Bio-Oil Formed by Fast Pyrolysis

| | Fast Pyrolysis |
|---|---|
| Density (g/cm$^3$) | 1.2 |
| Oxygen (wt %) (By difference) | 49.4% |
| Oxygen Excl Water (wt %) | 30.2% |
| Carbon (wt %) | 43.9% |
| Hydrogen (wt %) | 6.7% |
| Hydrogen Excl Water (wt %) | 4.3% |
| Nitrogen (wt %) | <0.1% |
| Water (wt %) | 21.6% |
| H/C (mole ratio excl water) | 1.19 |
| (H—2O)/C (mole ratio excl water) | 0.16 |
| O/C (mole ratio excl water) | 0.52 |
| H/O (mole ratio excl water) | 2.30 |

Table 2 shows properties for a vacuum gas oil (VGO) feed. Table 2 includes elemental analysis of the VGO as well as a distillation profile according to ASTM D2887.

TABLE 2

Properties of VGO

| | | VGO |
|---|---|---|
| C | wt % | 86.2 |
| H | wt % | 12.3 |
| N | wt % | 0.12 |
| O | wt % | 0.24 |
| S | wt % | 1.23 |
| MCRT | wt % | 0.61 |
| Density at 40° C. | g/cm$^3$ | 0.9008 |
| SimDis | | |
| IBP | ° C. | 211.5 |
| 5% | ° C. | 317.8 |
| 10% | ° C. | 347.1 |
| 20% | ° C. | 378.4 |
| 30% | ° C. | 399.9 |
| 40% | ° C. | 417.6 |
| 50% | ° C. | 433.9 |
| 60% | ° C. | 451.8 |
| 70% | ° C. | 471.2 |
| 80% | ° C. | 495.5 |
| 90% | ° C. | 529 |
| 95% | ° C. | 558.8 |
| 99% | ° C. | 617.2 |
| FBP | ° C. | 632.6 |

Comparative Example 3—Co-Processing 5.0 wt % Fast Pyrolysis Oil with VGO

The fast pyrolysis oil shown in Table 1 and the vacuum gas oil shown in Table 2 were used to make a series of feedstocks. One feedstock corresponded to a mixture of 5.0 wt % of the fast pyrolysis oil, with the balance corresponding to the VGO. Another feedstock corresponded to just the VGO. A surfactant was not added to the feedstocks in this example.

The feedstocks were processed under laboratory scale fluid catalytic cracking conditions. The process conditions included a temperature of 968° F. (~520° C.) and a catalyst to oil ratio of 6.12.

Table 3 shows the testing results. As shown in Table 3, three types of values were calculated. The first column in Table 3 corresponds to results from processing of just the VGO. The second column corresponds to results from processing the mixture of 5.0 wt % fast pyrolysis oil mixed with the VGO. The third column corresponds to the yield achieved for just the fast pyrolysis oil portion of the feedstock. The yield on fast pyrolysis oil (FPO) was determined by subtracting the yield for the 5.0 wt % fast pyrolysis oil feedstock from the yield for the VGO only feedstock, and then attributing the yield difference to the weight of the fast pyrolysis oil. Mathematically, this can be expressed as:

$$\text{Yield on } FPO \text{ basis} = \frac{\text{Yield for } X\% FPO \text{ with } VGO - (1 - X\%) * \text{Yield for } VGO}{X\%} \quad (1)$$

It is noted that the water present in the fast pyrolysis oil was excluded when determining the conversion shown in Table 3.

TABLE 3

Pilot plant test results of co-processing
5% fast pyrolysis oil with VGO

|  | Base | 5% FPO | Yield on FPO |
|---|---|---|---|
| 221° C. Conversion, wt % | 72.1 | 72.5 |  |
| CO | 0.03 | 0.02 | −0.04 |
| $CO_2$ | 0.15 | 0.12 | −0.37 |
| $H_2O$ | 0.16 | 2.49 | 46.77 |
| $H_2S$ | 0.00 | 0.00 | 0.00 |
| Hydrogen ($H_2$) | 0.31 | 0.36 | 1.30 |
| Dry Gas ($C_1$, $C_2$) | 1.82 | 1.88 | 3.05 |
| LPG ($C_3$, $C_4$) | 19.34 | 19.54 | 23.40 |
| Naphtha ($C_5$-221° C.) | 44.77 | 43.46 | 18.68 |
| LCO (221-343° C.) | 18.06 | 17.00 | −3.10 |
| Bottom (343° C.+) | 9.85 | 9.38 | 0.52 |
| Coke | 5.52 | 5.74 | 9.79 |

As shown in Table 3, the conversion relative to 430° F. (~221° C.) was similar for both feedstocks. Since fast pyrolysis oil contains roughly half of the C as VGO, yields for naphtha, diesel and bottom were all decreased as expected. Coke yield slightly increased. Based on the yield calculation, only ~16% of the fast pyrolysis oil was converted to liquid product. It is noted that tests with ≥10% fast pyrolysis oil were attempted and failed due to line plugging in pilot plant unit.

Figure 2:
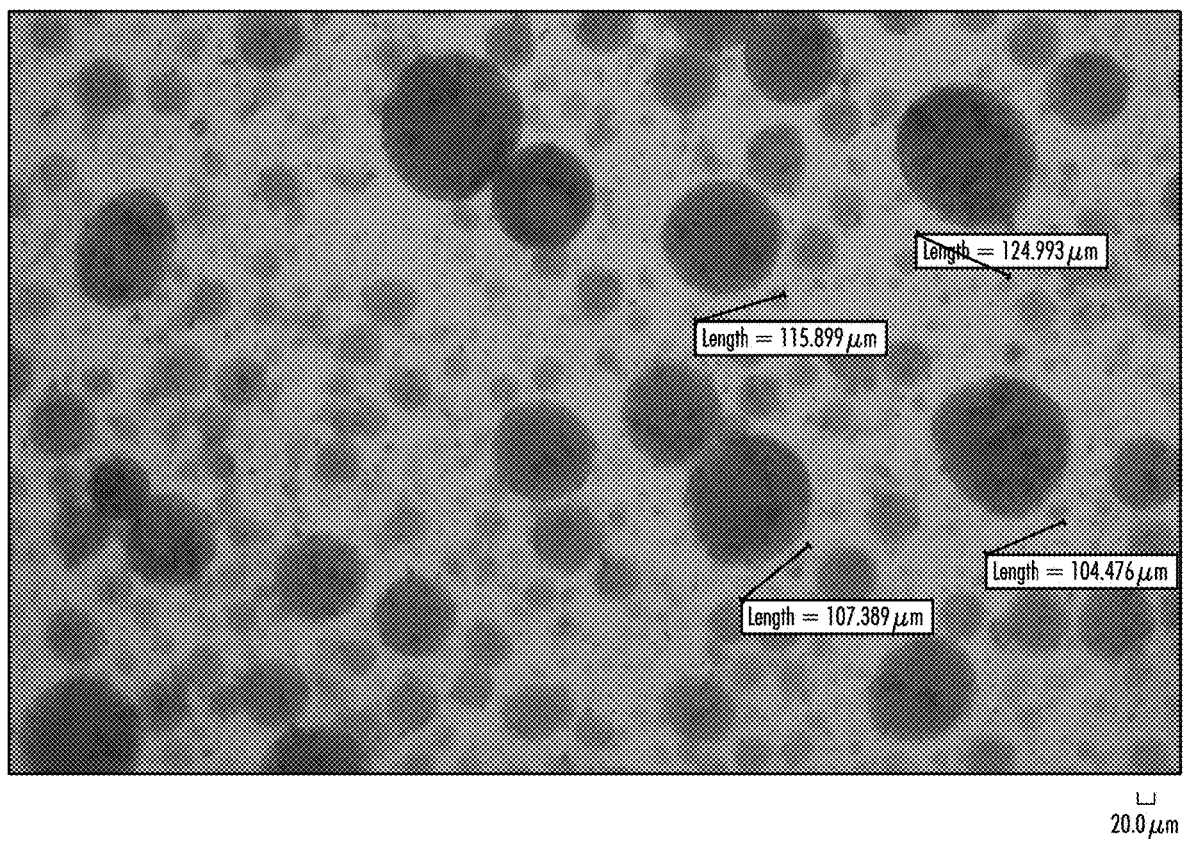
FIG. 2 shows a microscope picture of droplets of fast pyrolysis oil dispersed in a vacuum gas oil.

Example 4—Co-Processing 5.0 wt % and 20 wt % Fast Pyrolysis Oil with VGO in the Presence of Low Molecular Weight, Non-Ionic Surfactant Fast pyrolysis has a relatively high oxygen content and corresponds to a polar substance. As a result, fast pyrolysis oil is not miscible with VGO. FIG. 2 shows a visual microscope picture of a mixture of the fast pyrolysis oil from Table 1 (20 wt %) and the vacuum gas oil from Table 2 (balance). As shown in FIG. 2, the mixture corresponds to large droplets of the fast pyrolysis oil distributed in the vacuum gas oil. The droplets shown in FIG. 2 correspond to droplets having a size of several hundred microns.

Figure 3:
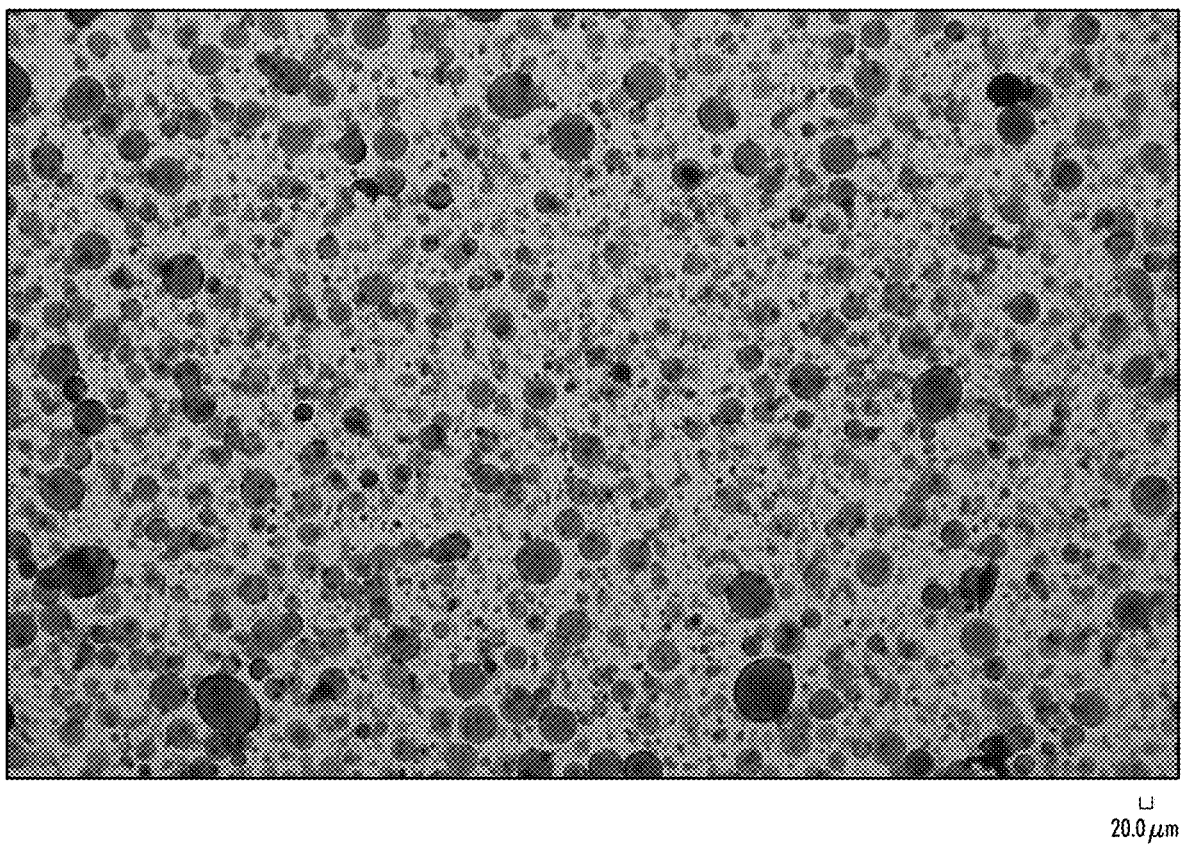
FIG. 3 shows a microscope picture of droplets of fast pyrolysis oil dispersed in a vacuum gas oil in the presence of a low molecular weight, non-ionic surfactant.

FIG. 3 shows a visual microscope picture of a similar 20 wt % mixture of fast pyrolysis oil and VGO, but this time with 0.1 wt % of a low molecular weight, non-ionic surfactant added to the mixture. The surfactant was Triton™ X-100, which has a molecular weight of roughly 650 g/mol. As shown in FIG. 3, addition of the low molecular weight, non-ionic surfactant resulted in a substantial reduction in droplet size. It is noted that the same scale is used in FIG. 2 and FIG. 3.

Feedstocks were formed that corresponded to a mixture of a) 5.0 wt % or 20 wt % of the fast pyrolysis oil from Table 1, b) 0.1 wt % of Triton™ X-100, and c) the vacuum gas oil from Table 2 (balance of mixture). After combining the components for the feedstock, the feedstocks were mixed prior to introduction into the laboratory scale fluid catalytic cracking apparatus. The feedstocks were processed under conditions similar to the conditions used for Comparative Example 3. With 0.1 wt % additive, pilot plant operation was improved without plugging even at 20% FPO co-processing.

Table 4 shows results from co-processing of fast pyrolysis oil (FPO) in the presence of a low molecular weight, non-ionic surfactant.

TABLE 4

Co-Processing of 5.0 wt % and 20 wt % Fast Pyrolysis
Oil with VGO in the Presence of 0.1 wt % Low
Molecular Weight, Non-Ionic Surfactant

|  | Base | 5% FPO + 0.1% additive | Yield on FPO | 20% FPO + 0.1% additive | Yield on FPO |
|---|---|---|---|---|---|
| 221° C. Conversion, wt % | 72.1 | 72.3 |  | 71.8 |  |
| CO | 0.03 | 0.06 | 0.74 | 0.11 | 0.43 |
| $CO_2$ | 0.15 | 0.15 | 0.14 | 0.19 | 0.36 |
| $H_2O$ | 0.16 | 2.28 | 42.58 | 8.82 | 43.43 |
| $H_2S$ | 0.00 | 0.00 | 0.00 | 0.00 | 0.00 |
| Hydrogen ($H_2$) | 0.31 | 0.26 | −0.57 | 0.22 | −0.13 |
| Dry Gas ($C_1$, $C_2$) | 1.82 | 1.88 | 3.14 | 1.83 | 1.90 |
| LPG ($C_3$, $C_4$) | 19.34 | 19.08 | 14.25 | 18.32 | 14.26 |
| Naphtha ($C_5$-221° C.) | 44.77 | 43.95 | 28.37 | 41.55 | 28.65 |
| LCO (221-343° C.) | 18.06 | 17.49 | 6.73 | 15.42 | 4.87 |
| Bottom (343° C.+) | 9.85 | 9.09 | −5.43 | 8.49 | 3.03 |
| Coke | 5.52 | 5.75 | 10.05 | 5.05 | 3.18 |

As shown in Table 4, total liquid yield on the fast pyrolysis oil increased from ~16% to ~30% for the feedstock containing 5.0 wt % fast pyrolysis oil after adding 0.1% of the low molecular weight, non-ionic surfactant to the mixture. A similar yield improvement was also observed for the mixture including 20 wt % fast pyrolysis oil.

Unexpectedly, processing of the feedstock including 20 wt % fast pyrolysis oil in the presence of a low molecular weight, non-ionic surfactant resulted in a decrease in net coke production. This is in contrast to both Comparative Example 3, where no surfactant was used. This is also in contrast to the result from co-processing of 5.0 wt % fast pyrolysis oil in the presence of the surfactant. Without being bound by any particular theory, it is believed using 0.1 wt % of the low molecular weight, non-ionic surfactant with 5.0 wt % fast pyrolysis oil resulted in a weight ratio of surfactant to fast pyrolysis oil (0.02) that was too high to achieve a reduction in coke. By contrast, in the feedstock with 20 wt % fast pyrolysis oil, the weight ratio of surfactant to fast pyrolysis oil was 0.005. It is believed that this lower weight ratio of surfactant to fast pyrolysis oil contributed to achieving a net reduction in coke production.

ADDITIONAL EMBODIMENTS

Embodiment 1. A method for co-processing pyrolysis oil, comprising: exposing a feedstock comprising a) 5.0 wt % to 35 wt % of a pyrolysis oil, the pyrolysis oil comprising an oxygen content, excluding water, of 20 wt % or more, b) 0.01 wt % to 1.0 wt % of a non-ionic surfactant having a molecular weight of 300 g/mol to 2000 g/mol, and c) 65 wt % or more of a feed comprising 10 wt % or more of hydrogen and a T10 distillation point of 300° C. or higher, to a catalyst in a reactor under fluid catalytic cracking conditions to form one or more liquid product fractions.

Embodiment 2. The method of Embodiment 1, wherein the feedstock comprises a weight ratio of non-ionic surfactant to pyrolysis oil of 0.0005 to 0.01.

Embodiment 3. The method of any of the above Embodiments, wherein the fluid catalytic cracking conditions comprise a conversion of 60 wt % or more, the conversion being calculated on a basis that excludes water from the feedstock.

Embodiment 4. The method of any of the above embodiments, wherein the feedstock comprises 12 wt % to 25 wt % of the pyrolysis oil.

Embodiment 5. The method of any of the above embodiments, wherein the pyrolysis oil comprises 20 wt % or more of water.

Embodiment 6. The method of Embodiment 5, wherein the pyrolysis oil, including water, comprises 40 wt % or more of oxygen.

Embodiment 7. The method of any of the above embodiments, wherein the pyrolysis oil, excluding water, comprises 6.0 wt % or less of hydrogen.

Embodiment 8. The method of any of the above embodiments, wherein the feedstock comprises 65 wt % or more of a feed comprising 12 wt % or more of hydrogen and a T10 distillation point of 300° C. or higher.

Embodiment 9. The method of any of the above embodiments, wherein the feed comprising 10 wt % or more of hydrogen further comprises a T10 distillation point of 340° C. or higher.

Embodiment 10. The method of any of the above embodiments, wherein the feed comprising 10 wt % or more of hydrogen further comprises a T90 distillation point of 600° C. or less.

Embodiment 11. The method of any of the above embodiments, wherein the feedstock comprises 75 wt % or more of the feed comprising 10 wt % or more of hydrogen.

Embodiment 12. The method of any of the above embodiments, further comprising mixing the pyrolysis oil, the non-ionic surfactant, and the feed comprising 10 wt % or more of hydrogen prior to exposing the feedstock to the fluid catalytic cracking conditions, wherein the mixing is performed prior to the feedstock entering the reactor.

Embodiment 13. The method of any of the above embodiments, wherein the non-ionic surfactant has a molecular weight of 1500 g/mol or less.

Embodiment 14. The method of any of the above embodiments, wherein the feedstock comprises 0.05 wt % to 1.0 wt % of the non-ionic surfactant.

Embodiment 15. The method of any of the above embodiments, wherein the one or more liquid product fractions comprise at least one of a naphtha fraction and a light cycle oil fraction.

Additional Embodiment A. A liquid product fraction formed according to the method of any of Embodiments 1 to 15.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

What is claimed is:

1. A method for co-processing pyrolysis oil, comprising: exposing a feedstock comprising
    a) 21 wt % to 35 wt % of a pyrolysis oil, the pyrolysis oil comprising an oxygen content, excluding water, of 20 wt % or more,
    b) 0.01 wt % to 1.0 wt % of a non-ionic surfactant having a molecular weight of 500 g/mol to 1200 g/mol, and
    c) 65 wt % or more of a feed comprising 10 wt % or more of hydrogen and a T10 distillation point of 300° C. or higher,
    to a catalyst in a reactor under fluid catalytic cracking conditions to form one or more liquid product fractions;
    wherein the feedstock comprises a weight ratio of non-ionic surfactant to pyrolysis oil of 0.0005 to 0.0024.

2. The method of claim 1, wherein the non-ionic surfactant has a molecular weight of 500 g/mol to 1200 g/mol.

3. The method of claim 1, wherein the fluid catalytic cracking conditions comprise a conversion of 60 wt % or more, the conversion being calculated on a basis that excludes water from the feedstock.

4. The method of claim 1, wherein the feedstock comprises 25 wt % to 35 wt % of the pyrolysis oil.

5. The method of claim 1, wherein the feedstock comprises 21 wt % to 25 wt % of the pyrolysis oil.

6. The method of claim 1, wherein the pyrolysis oil comprises 20 wt % or more of water.

7. The method of claim 6, wherein the pyrolysis oil, including water, comprises 40 wt % or more of oxygen.

8. The method of claim 1, wherein the pyrolysis oil, excluding water, comprises 6.0 wt % or less of hydrogen.

9. The method of claim 1, wherein the feedstock comprises 65 wt % or more of a feed comprising 12 wt % or more of hydrogen and a T10 distillation point of 300° C. or higher.

10. The method of claim 1, wherein the feed comprising 10 wt % or more of hydrogen further comprises a T10 distillation point of 340° C. or higher.

11. The method of claim 1, wherein the feed comprising 10 wt % or more of hydrogen further comprises a T90 distillation point of 600° C. or less.

12. The method of claim 1, wherein the feedstock comprises 78 wt % or less of the feed comprising 10 wt % or more of hydrogen.

13. The method of claim 1, further comprising mixing the pyrolysis oil, the non-ionic surfactant, and the feed comprising 10 wt % or more of hydrogen prior to exposing the feedstock to the fluid catalytic cracking conditions.

14. The method of claim 13, wherein the mixing is performed prior to the feedstock entering the reactor.

15. The method of claim 1, wherein the non-ionic surfactant has a molecular weight of 1500 g/mol or less.

16. The method of claim 1, wherein the non-ionic surfactant has a molecular weight of 500 g/mol to 2000 g/mol.

17. The method of claim 1, wherein the non-ionic surfactant has a molecular weight of 500 g/mol to 1500 g/mol.

18. The method of claim 1, wherein the feedstock comprises 0.05 wt % to 1.0 wt % of the non-ionic surfactant.

19. The method of claim 1, wherein the one or more liquid product fractions comprise at least one of a naphtha fraction and a light cycle oil fraction.

* * * * *